United States Patent
Thulasimani et al.

(10) Patent No.: US 9,542,718 B2
(45) Date of Patent: Jan. 10, 2017

(54) HEAD MOUNTED DISPLAY UPDATE BUFFER

(71) Applicant: Intel Corporation, Santa Clara, CA (US)

(72) Inventors: Sivakumar Thulasimani, Bangalore (IN); Ganesh S. T., Bangalore (IN); Sameer K P, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 88 days.

(21) Appl. No.: 14/575,612

(22) Filed: Dec. 18, 2014

(65) Prior Publication Data

US 2016/0180495 A1   Jun. 23, 2016

(51) Int. Cl.
| | | |
|---|---|---|
| G06T 19/00 | (2011.01) | |
| G06T 1/60 | (2006.01) | |
| G02B 27/01 | (2006.01) | |
| G06F 12/08 | (2016.01) | |

(52) U.S. Cl.
CPC ............... *G06T 1/60* (2013.01); *G02B 27/017* (2013.01); *G06F 12/0802* (2013.01); *G06T 19/006* (2013.01)

(58) Field of Classification Search
CPC .............. G02B 2027/014; G02B 2027/0198; G06T 19/006; G06F 3/012; G06F 3/013; G06F 3/011; G09G 2340/145; H04N 13/044
See application file for complete search history.

(56) References Cited

U.S. PATENT DOCUMENTS

| | | | | |
|---|---|---|---|---|
| 4,348,186 A | * | 9/1982 | Harvey | G09B 9/307 434/44 |
| 2007/0247457 A1 | | 10/2007 | Gustafsson et al. | |
| 2014/0087867 A1 | * | 3/2014 | Hightower | G02B 27/017 463/31 |
| 2014/0232620 A1 | * | 8/2014 | Fujigaki | G02B 27/017 345/8 |
| 2014/0267400 A1 | | 9/2014 | Mabbutt et al. | |

FOREIGN PATENT DOCUMENTS

| | | |
|---|---|---|
| JP | 2013258614 A | 12/2013 |
| KR | 20080089803 A | 10/2008 |
| KR | 20110080915 A | 7/2011 |

OTHER PUBLICATIONS

International Search Report, PCT No. PCT/US2015/053949, mailed on Mar. 8, 2016, 4 pages.

* cited by examiner

*Primary Examiner* — Jacinta M Crawford
*Assistant Examiner* — Diane Wills
(74) *Attorney, Agent, or Firm* — International IP Law Group, P.L.L.C.

(57) ABSTRACT

Techniques related to providing updates in a head mounted display (HMD) device are described herein. A HMD may be configured to display a view of an environment. An update buffer of the HMD device may be included to store image data. The image data may include image data for a current view of the environment and image data of the environment that is outside of the current view.

18 Claims, 8 Drawing Sheets

HEAD MOUNTED DISPLAY UPDATE BUFFER

BACKGROUND ART

In computer graphics, an image data may be rendered and provided to a display device. In some cases, a display device may include a head mounted display (HMD) device. HMD devices may be used in virtual reality systems wherein movement of the HMD results in a change in the image data to be displayed. In some cases, virtual reality sickness is a side effect of using an HMD in virtual reality or even augmented reality systems. A user of the HMD device may be sensitive to image updates due to the closeness of the HMD display to the user's eyes. For example, image updates that lag behind the user's head movement may cause discomfort. Image updates incurring a delay may be associated with the various components involved in an image update process flow. For example, a sensor at the HMD device may detect movement, and a sensor event may be sent to a source, such as a source computing device that is peripheral to the HMD. New updates may be rendered by the source, and provided back to the HMD. In some cases, these steps may require up to 40 milliseconds. This delay time may be associated with virtual reality sickness felt by a user.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

The subject matter disclosed herein relates to techniques for updating image data to be displayed at a head mounted display (HMD) device. As discussed above, updates to image data to be displayed at an HDM device may cause discomfort to a user when the updates lag behind movement of the HMD device in a virtual, or augmented, reality environment. The techniques described herein include storing image data for a current view of an environment to be displayed at the HMD device. Image data is stored at an update buffer of the HMD device. The image data includes image data for a current view of the environment, as well as image data of the environment that is outside of the current view. In other words, the update buffer may locally store a higher resolution of image data than a resolution for any given current view of a viewport of the HMD. Movements requiring image updates to be provided to the HMD device may be retrieved from the local update buffer thereby decreasing image update delays and improving the user experience.

Figure 1:
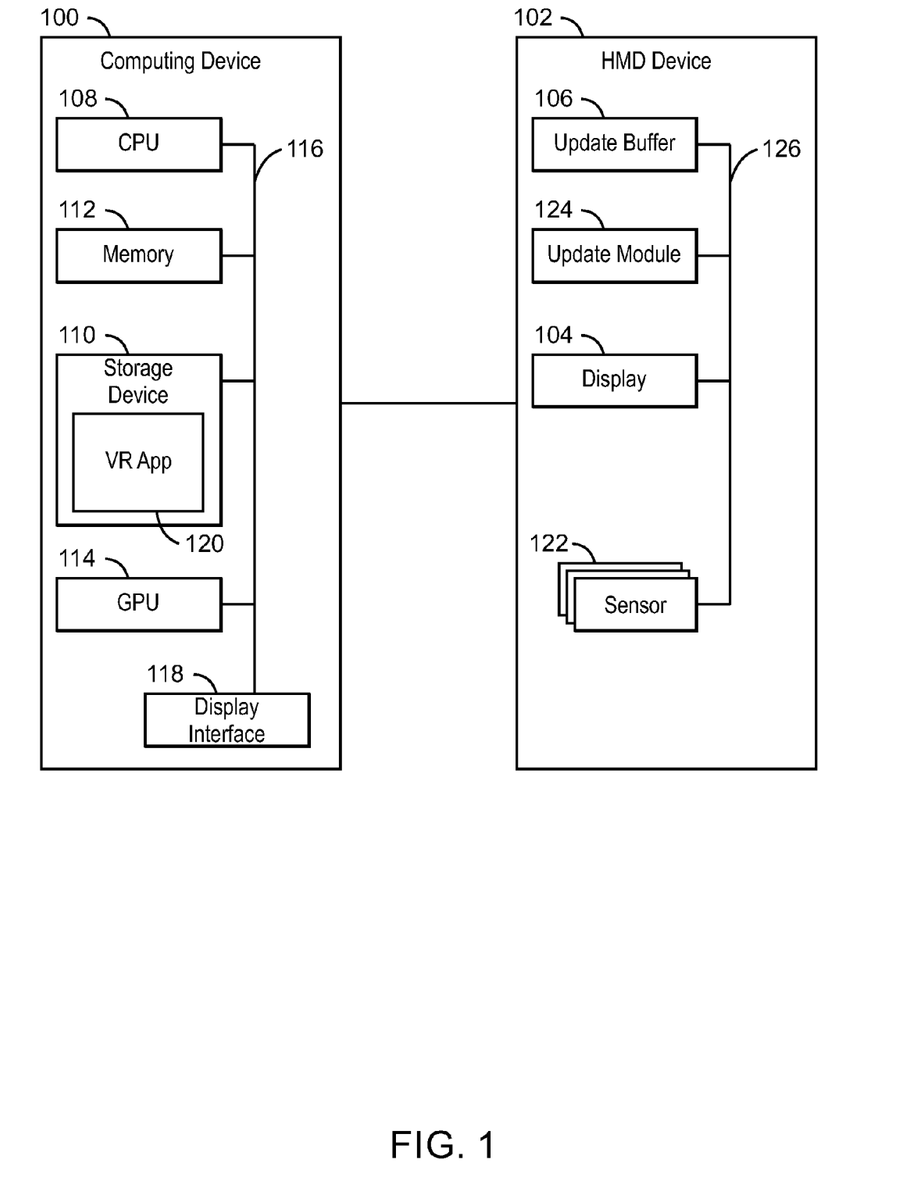
FIG. 1 is a block diagram illustrating a source computing device communicatively coupled to a head mounted display (HMD) device.

FIG. 1 is a block diagram illustrating a source computing device communicatively coupled to a head mounted display (HMD) device. The computing device 100 may be, for example, a laptop computer, desktop computer, ultrabook, tablet computer, mobile device, server, or digital video disk player, among others. In any case, the computing device 100 may be a video source configured to provide image data to the HMD device 102. The HMD device 102 may be a device worn on a head of a user. The HMD device 102 may include a display 104, an update buffer 106. The computing device 100 may include a central processing unit (CPU) 108 that is configured to execute stored instructions, as well as a storage device 110 including a non-transitory computer-readable medium, and a memory device 112.

The computing device 100 may also include a graphics processing unit (GPU) 114. As shown, the CPU 102 may be coupled through a bus 116 to the GPU 114. In embodiments, the GPU 114 is embedded in the CPU 102. The GPU 114 may include a cache, and can be configured to perform any number of graphics operations within the computing device 100. For example, the GPU 108 may be configured to render or manipulate graphics images, graphics frames, videos, or the like, to be displayed to a user of the computing device 100 at the HMD device 102 via a display interface 118.

In some cases, the images to be displayed at the HMD device 102 may be generated, in part, by a virtual reality application 120. In some cases, the virtual reality application 120 may include an augmented realty. In any case, the virtual reality application 120 may be configured to provide image data for an environment to be displayed to the HMD device 102. Image data of the environment is stored in the update buffer 106. The display 104 may be configured to display images within a viewport, and as the HMD device 102 is moved, sensors 122 may detect the movement and image data may be retrieved from the update buffer 106, rather than directly from a source device, such as the computing device 102. As discussed above, retrieving image data from a local buffer, such as the update buffer 106 of the HMD device 102 may decrease delay time associated with displaying images at the display 104.

The HMD device 102 may also include an update module 124. The update module 124, the sensors 122, the display 104, and the update buffer 106 may be communicatively coupled by a bus 126 similar to the bus 116 of the computing device discussed in more detail below. The update module 124 may be implemented as logic, at least partially comprising hardware logic. In some cases, the update module 124 may be implemented as an integrated circuit, microprocessor, and the like. The update module 124 may be configured to operate independently, in parallel, distributed, or as a part of a broader process.

The update module 124 may be configured to provide image data from the update buffer 106 to be displayed at the display 104 of the HMD device 102 based on an update policy. For example, the update policy may include providing updates for a new view of the environment resulting from movement of the HMD device 102 at a first priority, providing updates for a current view of the environment at a second priority lower than the first priority, and providing updates for the image data of the environment that is outside the current view at a third priority lower than the second priority.

In some cases, the update module 124 may be configured to determine when a movement of the HMD device 102 has occurred as detected by the sensors 122, and calculate a new position of a new view resulting from the movement. Content to be displayed at the HMD device 102 may be updated by providing image data from the update buffer 106. Further, the HMD device 102 may be configured to notify the computing device 100 of the movement.

The update module 124 may be configured to perform additional operations. For example, the update module 124 may be configured to perform selective updates, partial updates, and the like, as discussed in more detail below.

The CPU 102 may be linked through the bus 116 to the display interface 118 configured to connect the computing device 100 to the HMD device 102 via a digital display interface. The CPU 102 may be a main processor that is adapted to execute the stored instructions. The CPU 102 may be a single core processor, a multi-core processor, a computing cluster, or any number of other configurations. The CPU 102 may be implemented as Complex Instruction Set Computer (CISC) or Reduced Instruction Set Computer (RISC) processors, x86 Instruction set compatible processors, multi-core, or any other microprocessor or central processing unit (CPU).

The memory device 112 can include random access memory (RAM) (e.g., static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), etc.), flash memory, or any other suitable memory systems. The CPU 108 may be connected through the system bus 116 (e.g., Peripheral Component Interconnect (PCI), Industry Standard Architecture (ISA), PCI-Express, HyperTransport®, NuBus, etc.) to components including the memory 112 and the storage device 110.

The update buffer 106 may be a memory device similar to the memory device 112. For example, the update buffer 106 can include random access memory (RAM), read only memory (ROM), flash memory, or any other suitable memory systems.

The block diagram of FIG. 1 is not intended to indicate that the computing device 100 and HMD device 102 are to include all of the components shown in FIG. 1. Further, the computing device 100 and/or HMD device 102 may include any number of additional components not shown in FIG. 1, depending on the details of the specific implementation.

Figure 2:
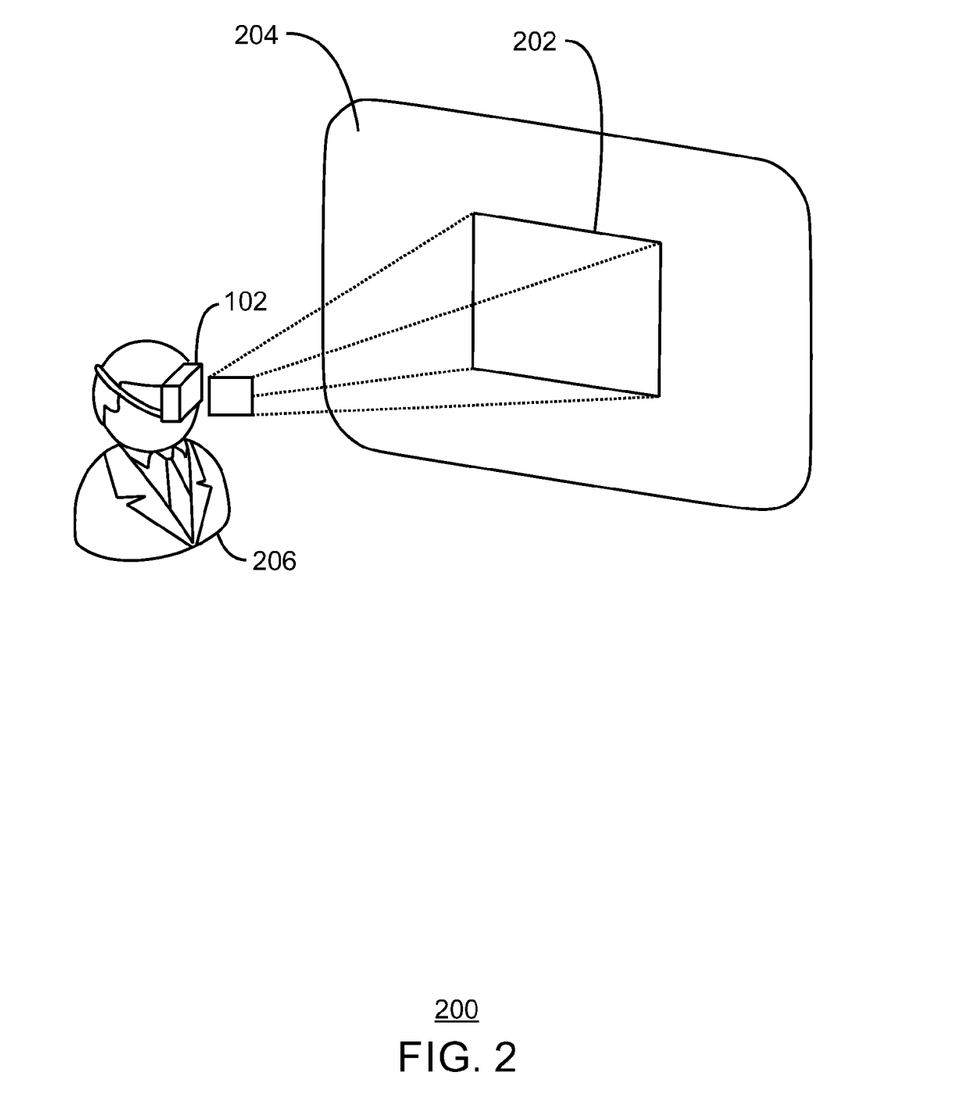
FIG. 2 is a diagram illustrating a HMD including a viewable area and an update buffer area.

FIG. 2 is a diagram illustrating a HMD including a viewable area and an update buffer area. As discussed above, the image data stored in the update buffer 106 of FIG. 1 may include more data than is viewable through a viewport of the HMD device 102. As illustrated in FIG. 2, a viewable area 202 indicates the area that is viewable at a display, such as the display 104 in FIG. 1 of the HMD device 102. In contrast, the update buffer 106 may include image data for both the viewable area 202 of a current view as well as image data for a larger area 204 such that movements of the user 206 may result in images to be provided to the HDM device 102 display with a reduced delay. In some cases, updates may be referred to herein as "zero-delay updates." An update is an operation wherein image content is displayed as changes in the displayed content occur as a result of movement of the user 206, as a result of changes in the content itself, or any combination thereof.

Figure 3:
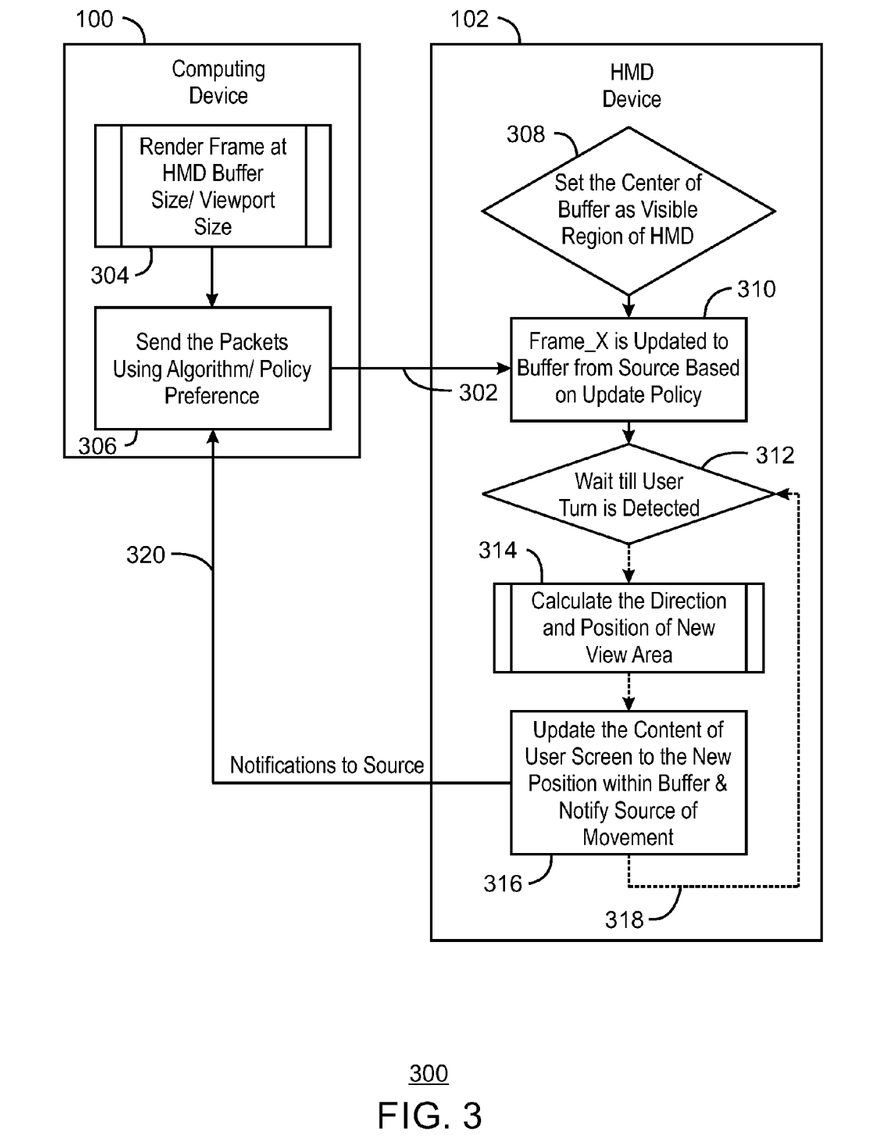
FIG. 3 is a process flow diagram of illustrating image updates that are provided from an update buffer.

FIG. 3 is a process flow diagram of illustrating image updates that are provided from an update buffer. A computing device, such as the computing device 100 of FIG. 1, may be a video source configured to provide image data to the HMD device 102, as indicated at 302. Image data may be rendered at 304 and packets may be sent at 306. The rendering at 304 may be of an entire frame, or based on selective updates, partial updates, or any combination thereof as discussed in more detail below in regard to FIGS. 5-7.

The packets sent at 306 may be sent based on a update policy as discussed above in regard to FIG. 1. More specifically, the update policy may send updates for a new view of the environment resulting from movement of the HMD device at a first priority. At a second priority that is lower than the first priority, updates are provided for a current view of the environment. Updates for the image data of the environment that is outside the current view at a third priority lower than the second priority. The update policy may be implemented by a module at the HMD device 102, such as the update module 124, by a module at the computing device 102, or any combination thereof.

At the HMD device 102, a center of the image data is set at an update buffer, such as the update buffer 106 of FIG. 1, based on the visible region, or current view being displayed at the HMD device 102, as indicated at 308. At 310, an updates frame is provided to the update buffer 106 based on the update policy. At 312, a movement is waited for, and at 314, a direction and position of a new view is calculated after movement is detected. At 316, the content to be displayed at the new view is updated at a display of the HMD, such as at the display 104 of FIG. 1. As indicated by the arrow 318, the process may return to 312 to wait until further movement is detected, while at 320, the computing device 100 is notified of the movement.

Figure 4:
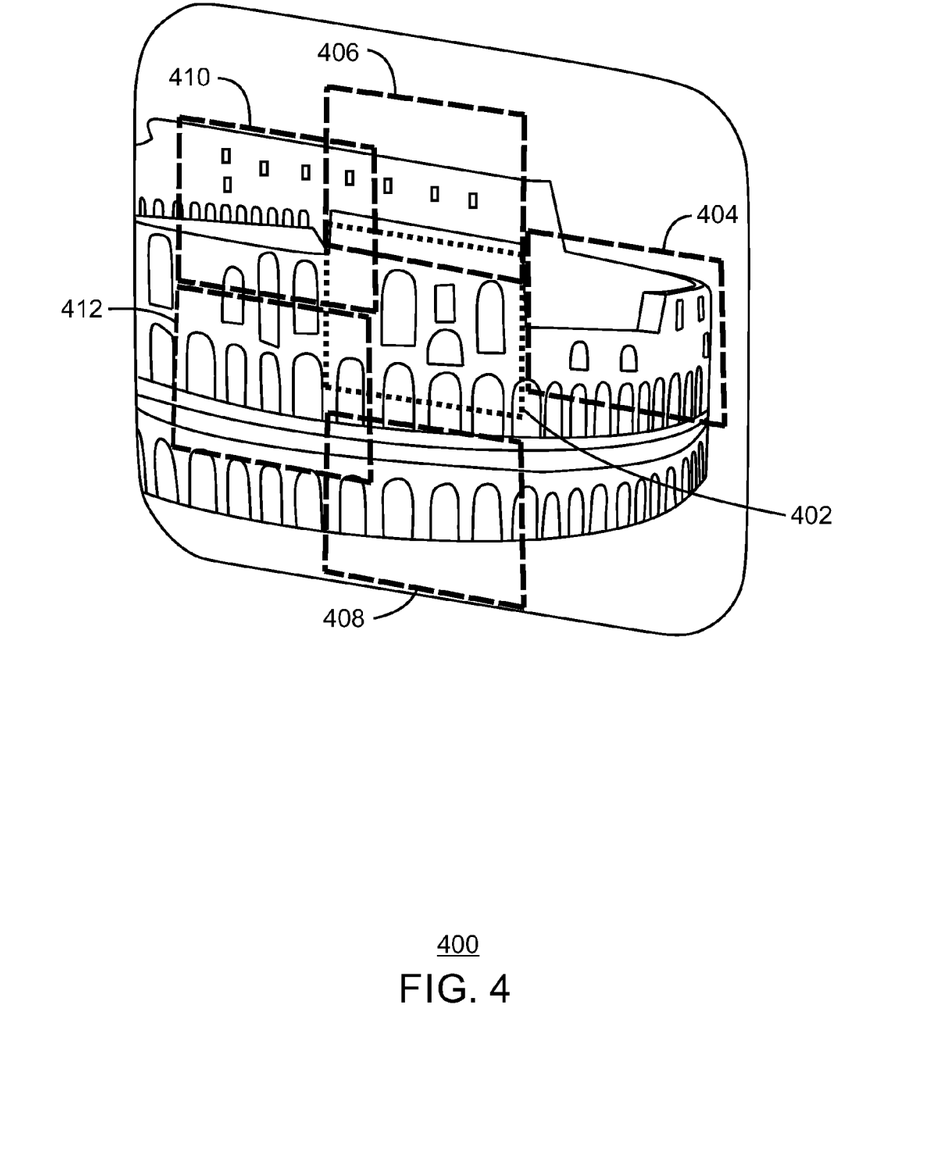
FIG. 4 is a diagram illustrating image updates that may be provided from the update buffer.

FIG. 4 is a diagram illustrating image updates that may be provided from the update buffer. As discussed above, updates to a display, such as the display 104 of the HMD 102 of FIG. 1 may be retrieved from a buffer that is local to the HMD, such as the update buffer 106. In FIG. 4, dashed boxes indicate views of image data. At 402, the dashed box indicates a current view. The boxes 404, 406, 408, 410, and 412 may be potential new views that may be displayed and retrieved from the update buffer 106, rather than requiring updates to be provided from a video source, such as the computing device 100 of FIG. 1 directly.

Figure 5:
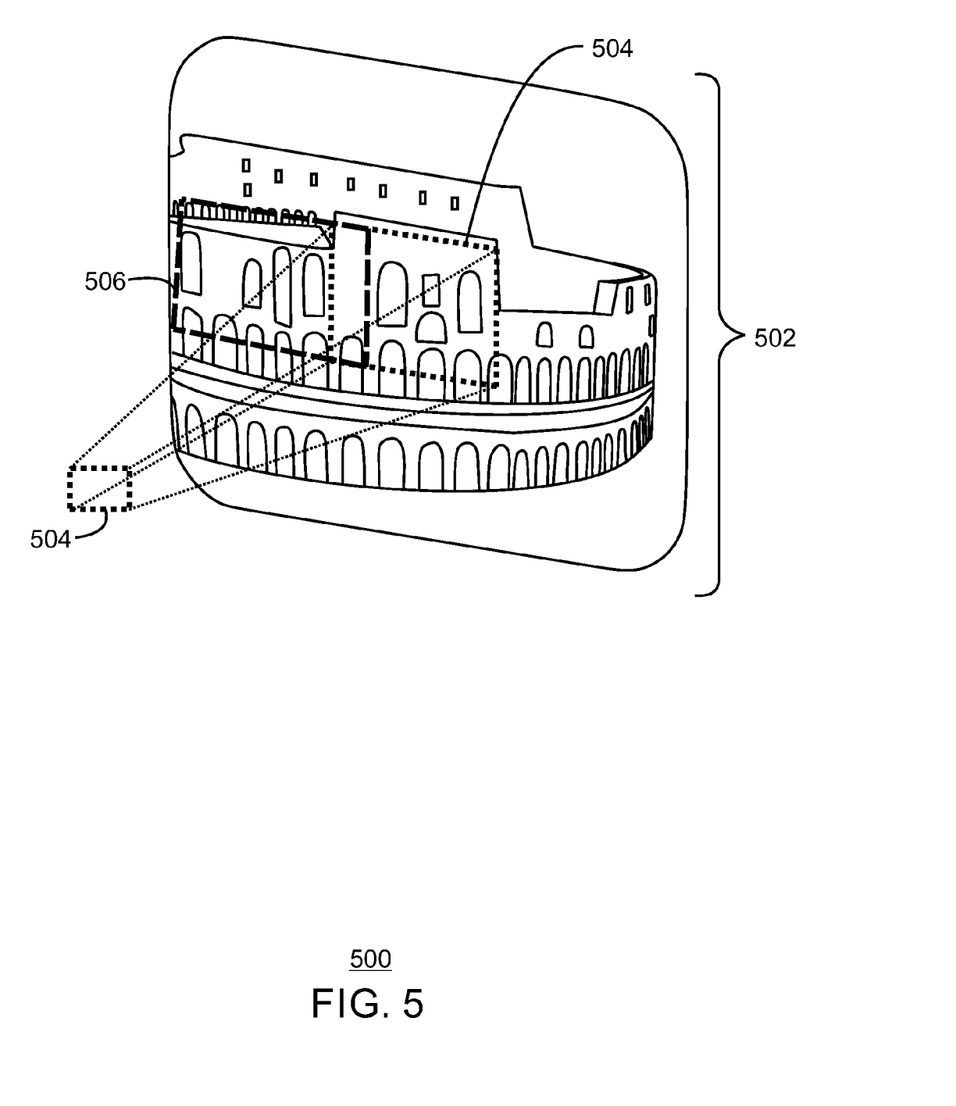
FIG. 5 is a first diagram illustrating partial updates that may be provided from a source computing device.

FIG. 5 is a first diagram illustrating partial updates that may be provided from a source computing device. In FIG. 5, the image data 502 of the update buffer 106 includes a current view 504, and a potential new view 506. As a user turns, the HMD device 102 of FIG. 1 may detect the movement. A turn to the left may reveal a port of the new view 506.

In some embodiments, revealing a portion of the new view may be referred to herein as a partial update. However, a partial update may also be considered an update provided from a video source, such as the computing device 102, to the update buffer 106 of FIG. 1, and as discussed in more detail below in regard to FIG. 6.

Figure 6:
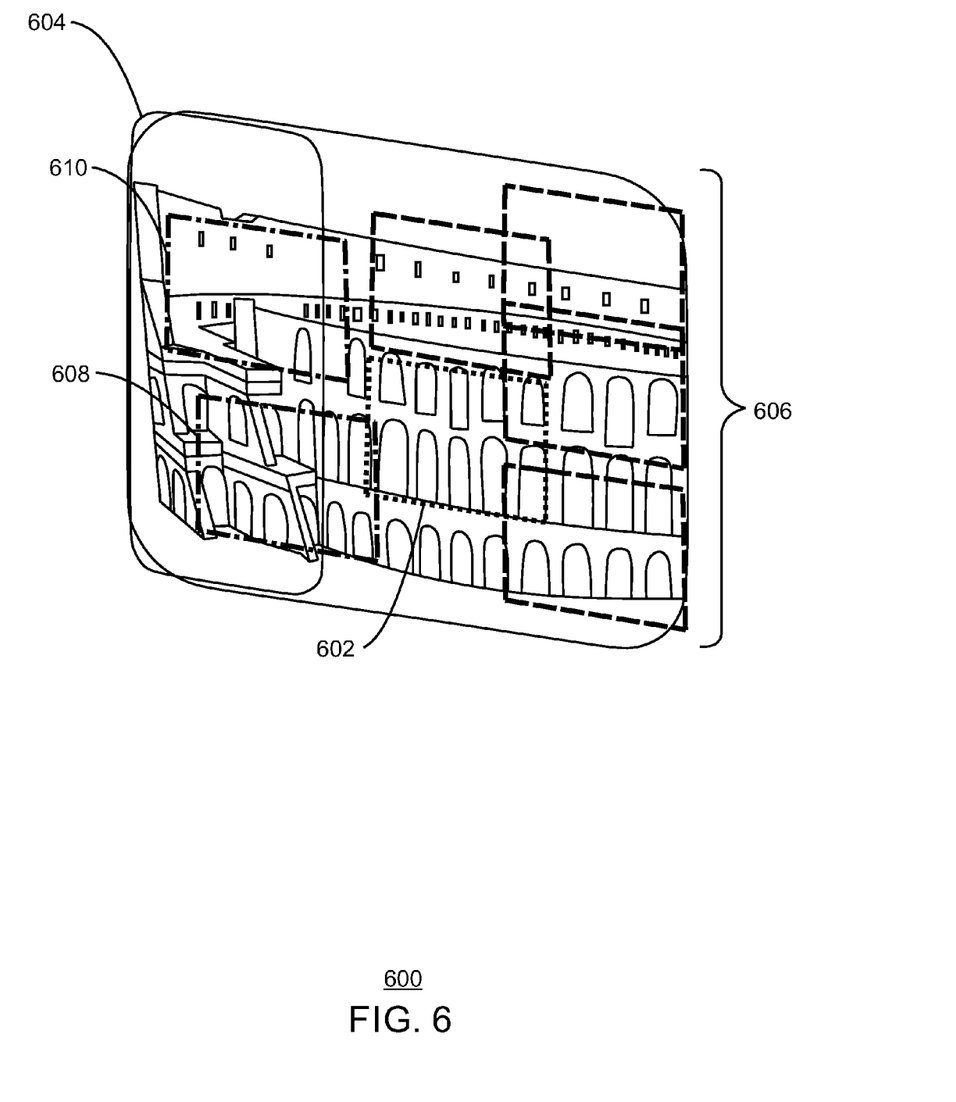
FIG. 6 is a second diagram illustrating partial updates that may be provided from a source computing device.

FIG. 6 is a second diagram illustrating partial updates that may be provided from a source computing device. In FIG. 6, 602 indicates a current view being displayed. In some cases, the update buffer 106 may not include image data associated with a portion 604 of an entire buffer frame 606. In this case, rather than requesting the entire buffer frame 606 from a video source, such as the computing device 100 of FIG. 1, a partial update including only the portion 604 of the entire buffer frame 606 may be provided from the computing device 100. In this scenario, updates for potential views 610 and 612 retrieved from the computing device 100 through a partial update may reduce delay time that would otherwise occur if the entire buffer frame 606 was retrieved from the computing device 100.

Figure 7:
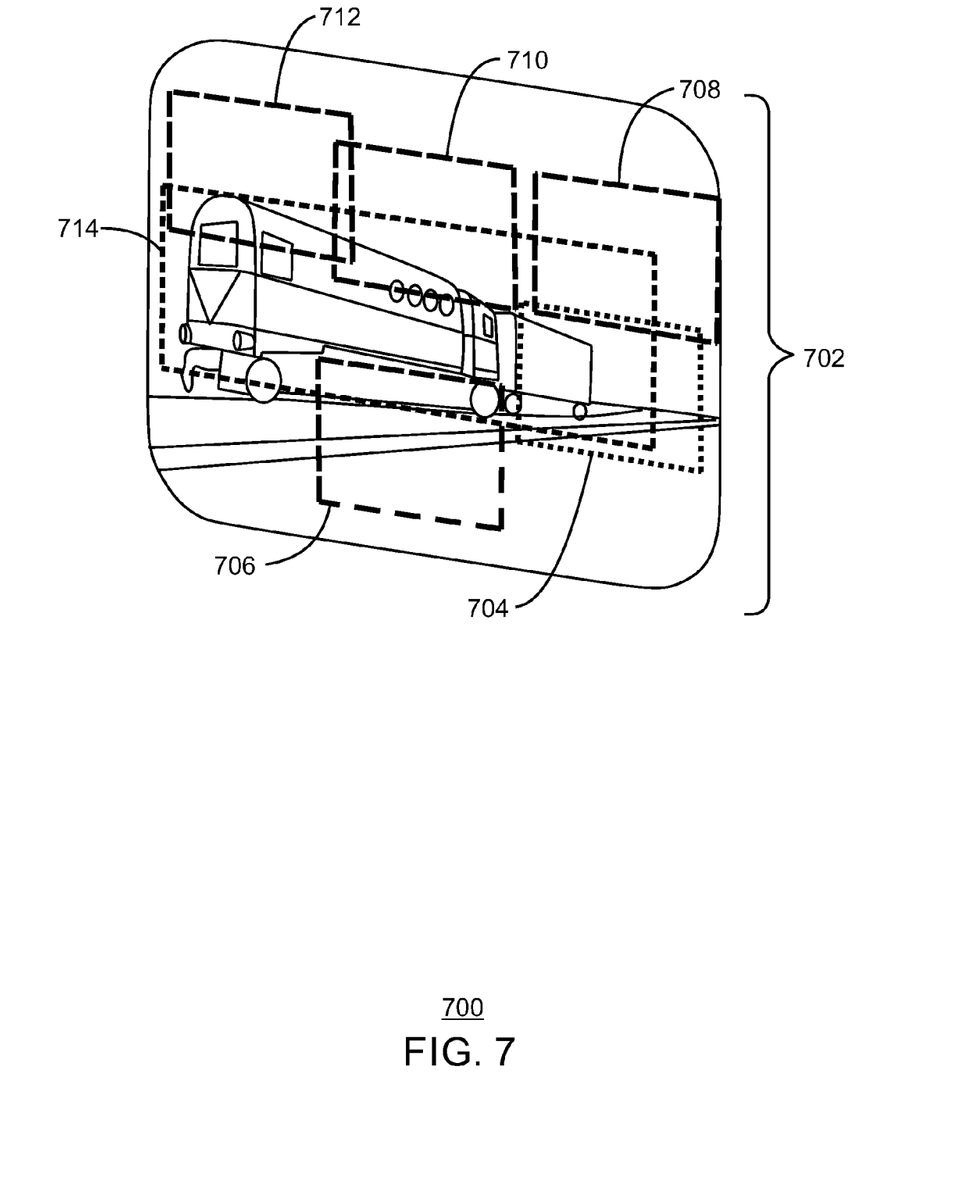
FIG. 7 is a diagram illustrating selective updates that may be provided from for changing image data.

FIG. 7 is a diagram illustrating selective updates that may be provided from for changing image data. In some cases, updates may be selectively provided from a video source, such as the computing device 100 of FIG. 1, to the update buffer 106 of the HMD 102. As illustrated in FIG. 7, the entire buffer frame 702 includes a current view 704 and other potential new views including 706, 708, 710, and 712. The techniques described herein include selectively updating a portion of the image data in the entire buffer frame 702 based on a rate of change in the image data.

For example, in FIG. 7, image data associated with a train may be changing rapidly within the region 714 than image data outside of the region 714. In this scenario, updates may be provided from the computing device 100 to the update buffer 106 for the region 714, as opposed to updates for the entire buffer frame 702. In this scenario, the updates to the update buffer 106 may be provided for image data that is within the current view 704, for image data that is outside of the current view 704, but within the region 714, or any combination thereof. The selective update may be triggered by a rate of change above a predetermined threshold, and may be directed by the update module 124 discussed above in regard to FIG. 2.

The selective and partial updates may, in some cases, work in conjunction with a update policy as discussed above in regard to FIG. 1 and FIG. 3. For example, in FIG. 7, updates to the region 714 that included in the current view 704 may be provided at a higher priority than updates provided for the region 714 that is outside of the current view 704.

Figure 8:
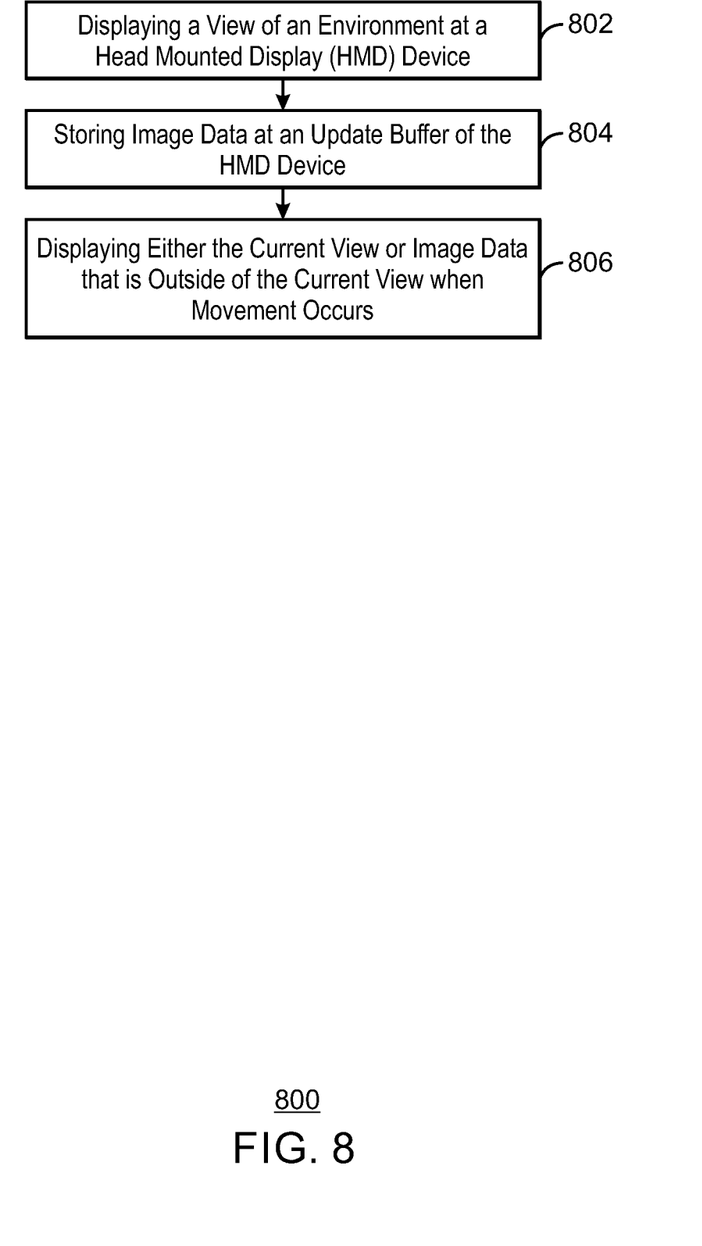
FIG. 8 is a block diagram illustrating a method for updating image data.

FIG. 8 is a block diagram illustrating a method for updating image data. At 802, a method 800 includes displaying a view of an environment at a head mounted display (HMD) device. At 804, the method 800 includes storing image data at an update buffer of the HMD device. The image data includes image data for a current view of the environment, and image data of the environment that is outside of the current view. In some cases, the method 800 may include displaying 806 either the current view or image data of the environment that is outside of the current view when movement of the HMD device occurs.

In some cases, the method 800 may include providing image data from the update buffer to be displayed at the HMD device based on an update policy. The update policy may include providing updates for a new view of the environment resulting from movement of the HMD at a first priority, and providing updates for a current view of the environment at a second priority lower than the first priority. The update policy may also include providing updates for the image data of the environment that is outside the current view at a third priority lower than the second priority.

In some cases, the method 800 may include providing updates to the update buffer from a source computing device external to the HMD device. The updates from the source computing device may include selective updates, partial updates, or any combination thereof.

Examples may include subject matter such as a method, means for performing acts of the method, at least one machine-readable medium including instructions that, when performed by a machine cause the machine to performs acts of the method. It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

Example 1 includes an apparatus for updating image data. The apparatus includes a head mounted display (HMD) device to display a view of an environment. The apparatus also includes an update buffer of the HMD device, wherein the update buffer is to store image data. The image data includes image data for a current view of the environment, and image data of the environment that is outside of the current view.

In Example 1, the apparatus may include any combination of the cases described below. In some cases, the apparatus includes an update module, at least partially comprising hardware logic, wherein the logic of the update module is to provide image data from the update buffer to be displayed at the HMD device based on an update policy. The update policy may include providing updates for a new view of the environment resulting from movement of the HMD device at a first priority, providing updates for a current view of the environment at a second priority lower than the first priority, and providing updates for the image data of the environment that is outside the current view at a third priority lower than the second priority.

In some cases, the apparatus comprises a source computing device external to the HMD device to provide updates to the update buffer, wherein the update module is to provide image data from the update buffer to be displayed at the HMD device rather than image data directly from the source computing device to be displayed at the HMD device. The update module may be configured to determine when movement of the HMD device has occurred, calculate a new position of a new view resulting from the movement, update content to be displayed at the HMD device by providing image data from the update buffer, and notify the source computing device of the movement. In some cases, the update module is further configured to direct the source to provide a selective update to the buffer, wherein the selective update comprises an update to image data in the current view that is changing above a predetermined threshold. In some cases, the update module is further configured to direct the source to provide a selective update to the buffer, wherein the selective update comprises an updates to the image data of the environment outside of the current view that is changing above a predetermined threshold. In some cases, the update module is further configured to retrieve a partial update from the update buffer, wherein the partial update comprises a portion of the current view and a portion of the image data of the environment that was previously outside of the current view after movement of the HMD device. In some cases, the update module is further configured to a retrieve partial update, wherein the partial update comprises a portion of a new view provided from the source when the portion is not available from the update buffer. Further, in some cases, the image data of the current view is of a lower size resolution than the image data of the environment that is outside of the current view.

Example 2 includes a method for updating image data. The method includes displaying a view of an environment at a head mounted display (HMD) device, and storing image data at an update buffer of the HMD device. The image data includes image data for a current view of the environment, and image data of the environment that is outside of the current view.

In Example 2, the method may include any combination of the cases described below. In some cases, the method includes providing image data from the update buffer to be displayed at the HMD device based on an update policy. The update policy may include providing updates for a new view of the environment resulting from movement of the HMD device at a first priority, providing updates for a current view of the environment at a second priority lower than the first priority, and providing updates for the image data of the environment that is outside the current view at a third priority lower than the second priority.

In some cases, the method includes providing updates to the update buffer from a source computing device external to the HMD device. The method may include determining when movement of the HMD device has occurred, calculate a new position of a new view resulting from the movement, update content to be displayed at the HMD device by providing image data from the update buffer, and notify the source computing device of the movement. In some cases, the method may include directing the source to provide a selective update to the buffer, wherein the selective update comprises an update to image data in the current view that is changing above a predetermined threshold. In some cases, the method may include directing the source to provide a selective update to the buffer, wherein the selective update comprises an updates to the image data of the environment outside of the current view that is changing above a predetermined threshold. In some cases, the method may include retrieving a partial update from the update buffer, wherein the partial update comprises a portion of the current view and a portion of the image data of the environment that was previously outside of the current view after movement of the HMD device. In some cases, method may include retrieving a partial update, wherein the partial update comprises a portion of a new view provided from the source when the portion is not available from the update buffer. Further, in some cases, the image data of the current view is of a lower size resolution than the image data of the environment that is outside of the current view.

Example 3 includes a system for updating image data. The system includes a head mounted display (HMD) device to display a view of an environment. The system also includes an update buffer of the HMD device, wherein the update buffer is to store image data. The image data includes image data for a current view of the environment, and image data of the environment that is outside of the current view. The system includes an update module, at least partially comprising hardware logic, wherein the logic of the update module is to provide image data from the update buffer to be displayed at the HMD device based on an update policy.

In Example 3, the system may include any combination of the cases described below. The update policy may include providing updates for a new view of the environment resulting from movement of the HMD device at a first priority, providing updates for a current view of the environment at a second priority lower than the first priority, and providing updates for the image data of the environment that is outside the current view at a third priority lower than the second priority.

In some cases, the system comprises a source computing device external to the HMD device to provide updates to the update buffer, wherein the update module is to provide image data from the update buffer to be displayed at the HMD device rather than image data directly from the source computing device to be displayed at the HMD device. The update module may be configured to determine when movement of the HMD device has occurred, calculate a new position of a new view resulting from the movement, update content to be displayed at the HMD device by providing image data from the update buffer, and notify the source computing device of the movement. In some cases, the update module is further configured to direct the source to provide a selective update to the buffer, wherein the selective update comprises an update to image data in the current view that is changing above a predetermined threshold. In some cases, the update module is further configured to direct the source to provide a selective update to the buffer, wherein the selective update comprises an updates to the image data of the environment outside of the current view that is changing above a predetermined threshold. In some cases, the update module is further configured to retrieve a partial update from the update buffer, wherein the partial update comprises a portion of the current view and a portion of the image data of the environment that was previously outside of the current view after movement of the HMD device. In some cases, the update module is further configured to a retrieve partial update, wherein the partial update comprises a portion of a new view provided from the source when the portion is not available from the update buffer. Further, in some cases, the image data of the current view is of a lower size resolution than the image data of the environment that is outside of the current view.

Example 4 includes a method for updating image data. The method includes displaying a view of an environment at a head mounted display (HMD) device, and storing image data at a means for storing image data at the HMD device. The image data includes image data for a current view of the environment, and image data of the environment that is outside of the current view.

In Example 4, the method may include any combination of the cases described below. In some cases, the method includes providing image data from the means for storing image data at the HMD device to be displayed at the HMD device based on an update policy. The update policy may include providing updates for a new view of the environment resulting from movement of the HMD device at a first priority, providing updates for a current view of the environment at a second priority lower than the first priority, and providing updates for the image data of the environment that is outside the current view at a third priority lower than the second priority.

In some cases, the method includes providing updates to the means for storing image data at the HMD device from a source computing device external to the HMD device. The method may include determining when movement of the HMD device has occurred, calculate a new position of a new view resulting from the movement, update content to be displayed at the HMD device by providing image data from the means for storing image data at the HMD device, and notify the source computing device of the movement. In some cases, the method may include directing the source to provide a selective update to the buffer, wherein the selective update comprises an update to image data in the current view that is changing above a predetermined threshold. In some cases, the method may include directing the source to provide a selective update to the buffer, wherein the selective update comprises an updates to the image data of the environment outside of the current view that is changing above a predetermined threshold. In some cases, the method may include retrieving a partial update from the means for storing image data at the HMD device, wherein the partial update comprises a portion of the current view and a portion of the image data of the environment that was previously outside of the current view after movement of the HMD device. In some cases, method may include retrieving a partial update, wherein the partial update comprises a portion of a new view provided from the source when the portion is not available from the means for storing image data at the HMD device. Further, in some cases, the image data of the current view is of a lower size resolution than the image data of the environment that is outside of the current view.

Example 5 includes an apparatus for updating image data. The apparatus includes a head mounted display (HMD) device to display a view of an environment. The apparatus also includes means for storing image data at the HMD device, wherein the means for storing image data at the HMD device is to store image data. The image data includes image data for a current view of the environment, and image data of the environment that is outside of the current view.

In Example 5, the apparatus may include any combination of the cases described below. In some cases, the apparatus includes an update module, at least partially comprising hardware logic, wherein the logic of the update module is to provide image data from the means for storing image data at the HMD device to be displayed at the HMD device based on an update policy. The update policy may include providing updates for a new view of the environment resulting from movement of the HMD device at a first priority, providing updates for a current view of the environment at a second priority lower than the first priority, and providing updates for the image data of the environment that is outside the current view at a third priority lower than the second priority.

In some cases, the apparatus comprises a source computing device external to the HMD device to provide updates to the means for storing image data at the HMD device, wherein the update module is to provide image data from the means for storing image data at the HMD device to be displayed at the HMD device rather than image data directly from the source computing device to be displayed at the HMD device. The update module may be configured to determine when movement of the HMD device has occurred, calculate a new position of a new view resulting from the movement, update content to be displayed at the HMD device by providing image data from the means for storing image data at the HMD device, and notify the source computing device of the movement. In some cases, the update module is further configured to direct the source to provide a selective update to the buffer, wherein the selective update comprises an update to image data in the current view that is changing above a predetermined threshold. In some cases, the update module is further configured to direct the source to provide a selective update to the buffer, wherein the selective update comprises an updates to the image data of the environment outside of the current view that is changing above a predetermined threshold. In some cases, the update module is further configured to retrieve a partial update from the means for storing image data at the HMD device, wherein the partial update comprises a portion of the current view and a portion of the image data of the environment that was previously outside of the current view after movement of the HMD device. In some cases, the update module is further configured to a retrieve partial update, wherein the partial update comprises a portion of a new view provided from the source when the portion is not available from the means for storing image data at the HMD device. Further, in some cases, the image data of the current view is of a lower size resolution than the image data of the environment that is outside of the current view.

In the above description and the following claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices.

An embodiment is an implementation or example. Reference in the present specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for updating image data, comprising:
a head mounted display (HMD) device to display a view of an environment;
an update buffer of the HMD device, wherein the update buffer is to store image data comprising:
image data for a current view of the environment; and
image data of the environment that is outside of the current view;
an update module, at least partially comprising hardware logic, wherein the logic of the update module is to provide image data from the update buffer to be displayed at the HMD device based on an update policy, wherein the update module is to provide image data from the update buffer to be displayed at the HMD device rather than image data directly from a source computing device to be displayed at the HMD device, wherein the source computing device is external to the HMD device and is to provide updates to the update buffer;
wherein the update module is further configured to direct the source to provide a selective update to the buffer, wherein the selective update comprises an update to image data in the current view that is changing above a predetermined threshold.

2. The apparatus of claim 1, wherein the update policy comprises:
providing updates for a new view of the environment resulting from movement of the HMD device at a first priority;
providing updates for a current view of the environment at a second priority lower than the first priority; and
providing updates for the image data of the environment that is outside the current view at a third priority lower than the second priority.

3. The apparatus of claim 1, wherein the update module is to:
determine when movement of the HMD device has occurred;
calculate a new position of a new view resulting from the movement;
update content to be displayed at the HMD device by providing image data from the update buffer; and
notify the source computing device of the movement.

4. The apparatus of claim 1, wherein the update module is further configured to direct the source to provide a selective update to the buffer, wherein the selective update comprises an update to the image data of the environment outside of the current view that is changing above a predetermined threshold.

5. The apparatus of claim 1, wherein the update module is further configured to retrieve a partial update from the update buffer, wherein the partial update comprises a portion of the current view and a portion of the image data of the environment that was previously outside of the current view after movement of the HMD device.

6. The apparatus of claim 1, wherein the update module is further configured to retrieve a partial update, wherein the partial update comprises a portion of a new view provided from the source when the portion is not available from the update buffer.

7. The apparatus of claim 1, wherein the image data of the current view is of a lower size resolution than the image data of the environment that is outside of the current view.

8. A method for updating image data, comprising:
displaying a view of an environment at a head mounted display (HMD) device;
storing image data at an update buffer of the HMD device, the image data comprising:
image data for a current view of the environment; and
image data of the environment that is outside of the current view;
providing image data from the update buffer to be displayed at the HMD device based on an update policy;
providing updates to the update buffer from a source computing device external to the HMD device; and
directing the source to provide a selective update to the buffer, wherein the selective update comprises an update to the image data of the environment that is outside of the current view that is changing above a predetermined threshold.

9. The method of claim 8, wherein the update policy comprises:
providing updates for a new view of the environment resulting from movement of the HMD at a first priority;
providing updates for a current view of the environment at a second priority lower than the first priority; and
providing updates for the image data of the environment that is outside the current view at a third priority lower than the second priority.

10. The method of claim 8, further comprising:
determining when movement of the HMD has occurred;
calculating a new position of a new view resulting from the movement;
update content to be displayed at the HMD device by providing image data from the update buffer; and
notify the source computing device of the movement.

11. The method of claim 8, further comprising directing the source to provide a selective update to the buffer, wherein the selective update comprises an update to image data in the current view that is changing above a predetermined threshold.

12. The method of claim 8, further comprising providing a partial update from the update buffer, wherein the partial update comprises a portion of the current view and a portion of the image data of the environment previously outside of the current view after movement of the HMD.

13. The method of claim 8, further comprising retrieving a partial update from the source, wherein the partial update comprises a portion of a new view provided from the source when the portion is not available from the update buffer.

14. The method of claim 8, wherein the image data of the current view is of a lower size resolution than the image data of the environment that is outside of the current view.

15. A system for updating image data, comprising:
a head mounted display (HMD) device to display a view of an environment;
an update buffer of the HMD device, wherein the update buffer is to store image data comprising:
image data for a current view of the environment; and
image data of the environment that is outside of the current view; and an update module, at least partially comprising hardware logic, wherein the logic of the update module is to provide image data from the update buffer to be displayed at the HMD device based on an update policy, wherein the update module is to:
  determine when movement of the HMD device has occurred;
  calculate a new position of a new view resulting from the movement;
  update content to be displayed at the HMD device by providing image data from the update buffer;
  notify the source computing device of the movement; and
  direct the source to provide selective updates to the buffer, wherein selective updates comprise partial updates, wherein partial updates comprise a portion of the current view and a portion of the image data of the environment that was previously outside of the current view after movement of the HMD device, a portion of a new view provided from the source when the portion is not available from the update buffer, or any combination thereof.

16. The system of claim 15, wherein the update policy comprises:
  providing updates for a new view of the environment resulting from movement of the HMD device at a first priority;
  providing updates for a current view of the environment at a second priority lower than the first priority; and
  providing updates for the image data of the environment that is outside the current view at a third priority lower than the second priority.

17. The system of claim 15, further comprising a source computing device that is external to the HMD device to provide updates to the update buffer, wherein the update module is to provide image data from the update buffer to be displayed at the HMD device rather than image data directly from the source computing device to be displayed at the HMD device.

18. The system of claim 15, wherein the update module is further configured to direct the source to:
  provide selective updates to the buffer, wherein selective updates comprise:
    updates to image data in the current view that is changing above a predetermined threshold;
    updates to the image data of the environment that is outside of the current view that is changing above a predetermined threshold; or
    any combination thereof.

* * * * *